Nov. 19, 1940.   N. LEE   2,221,978
MEASURING DEVICE
Filed Oct. 20, 1938   5 Sheets-Sheet 1

INVENTOR
NIXON LEE
BY W. Philip Churchill
ATTORNEY

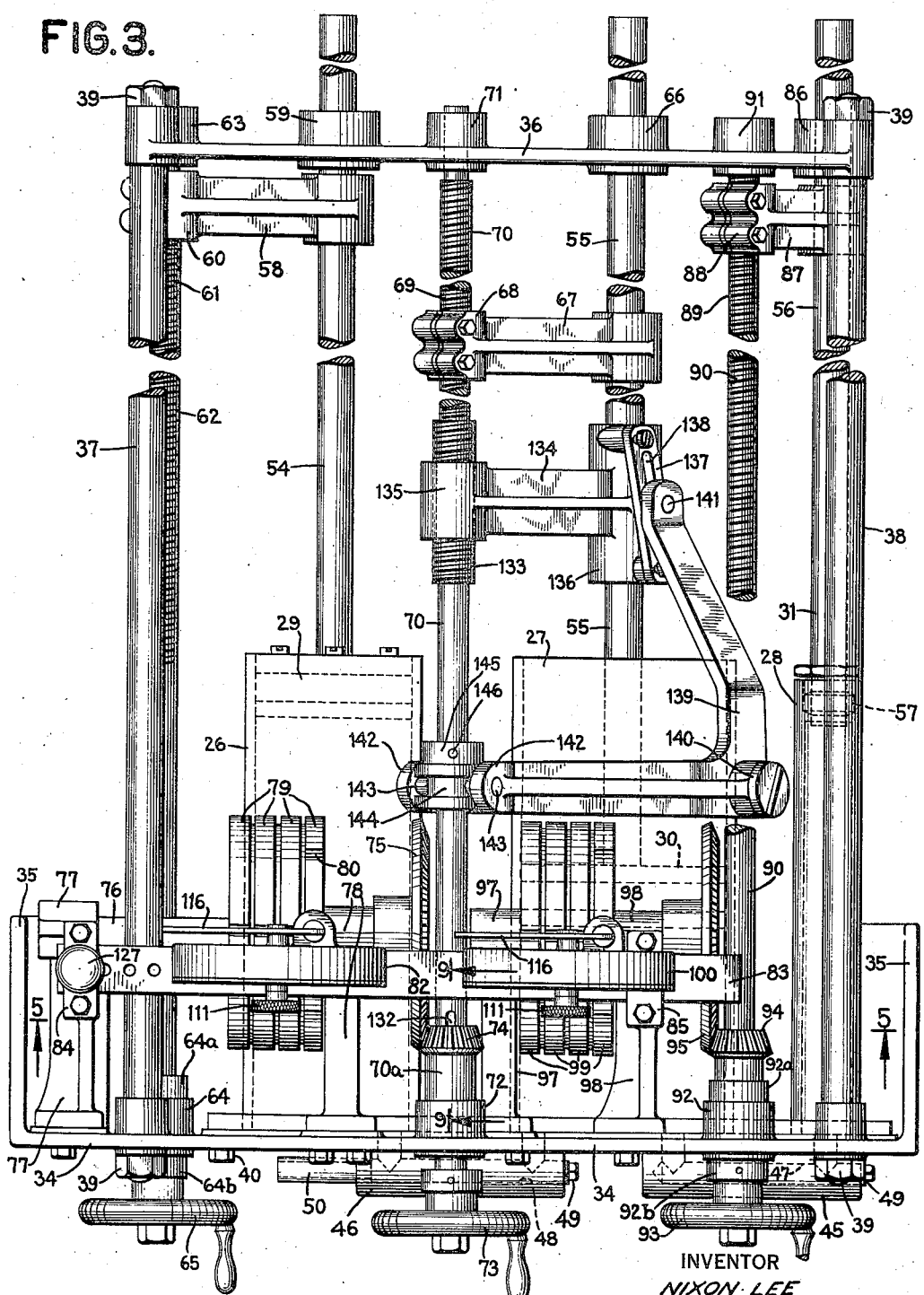

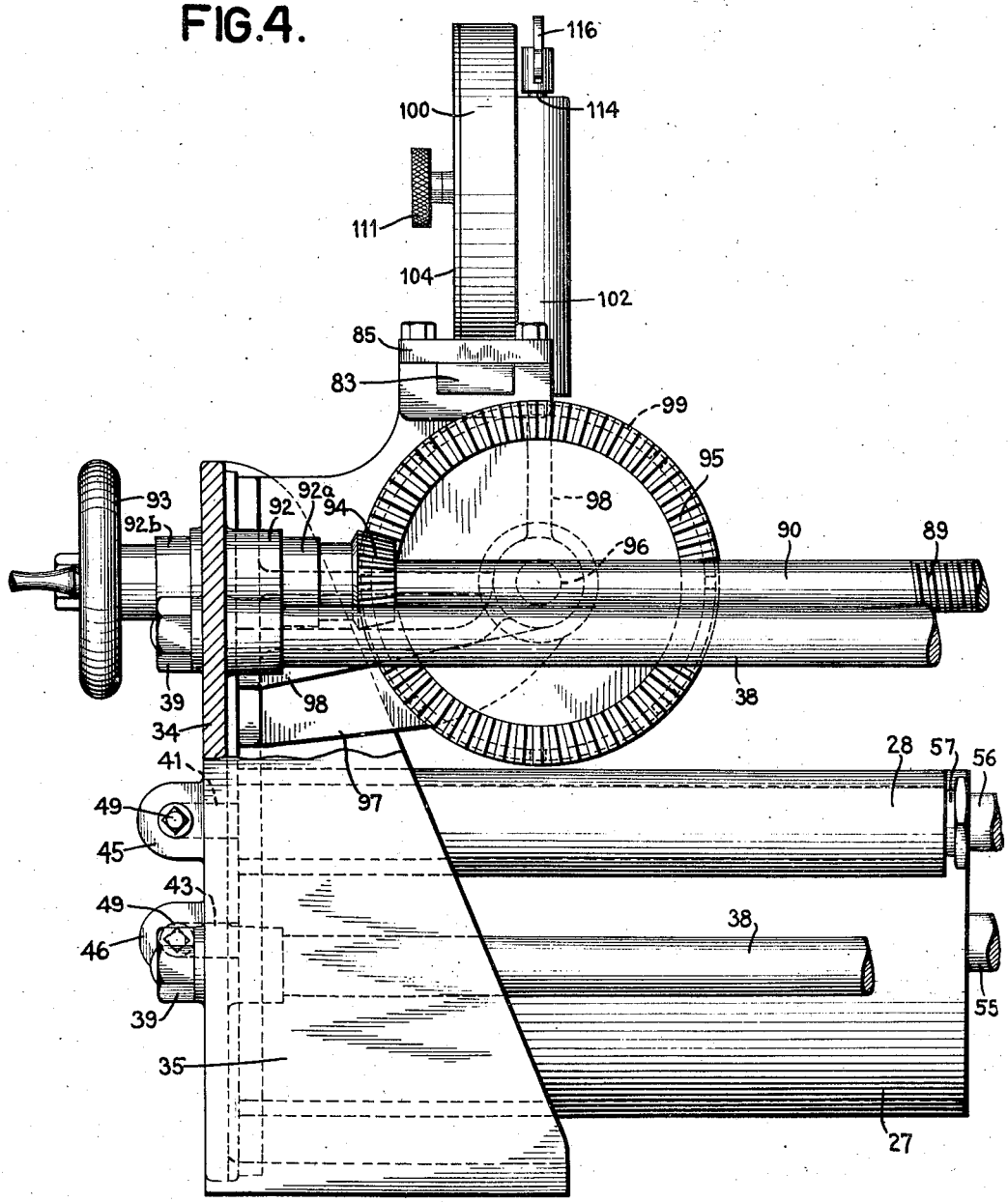

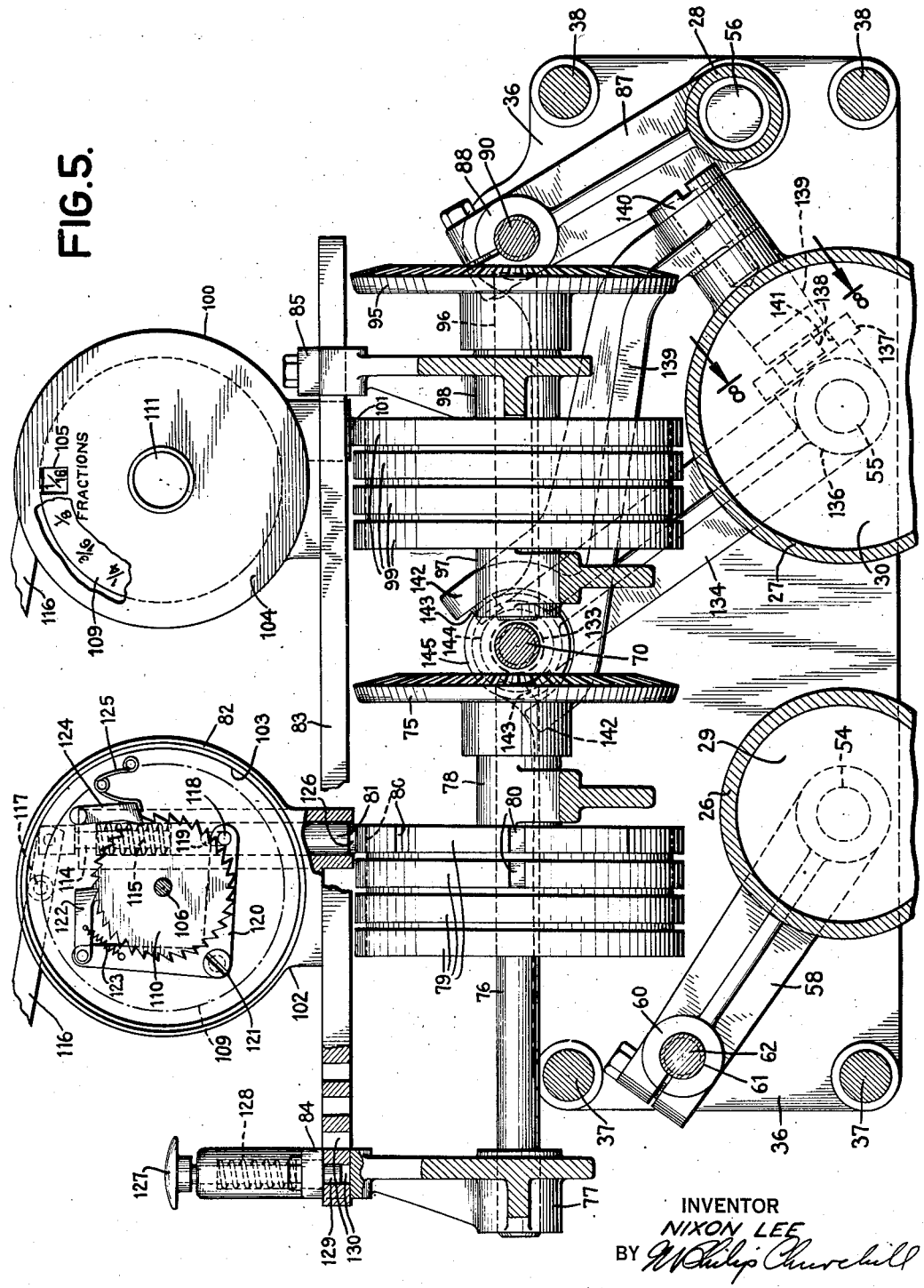

Nov. 19, 1940.   N. LEE   2,221,978
MEASURING DEVICE
Filed Oct. 20, 1938   5 Sheets-Sheet 5
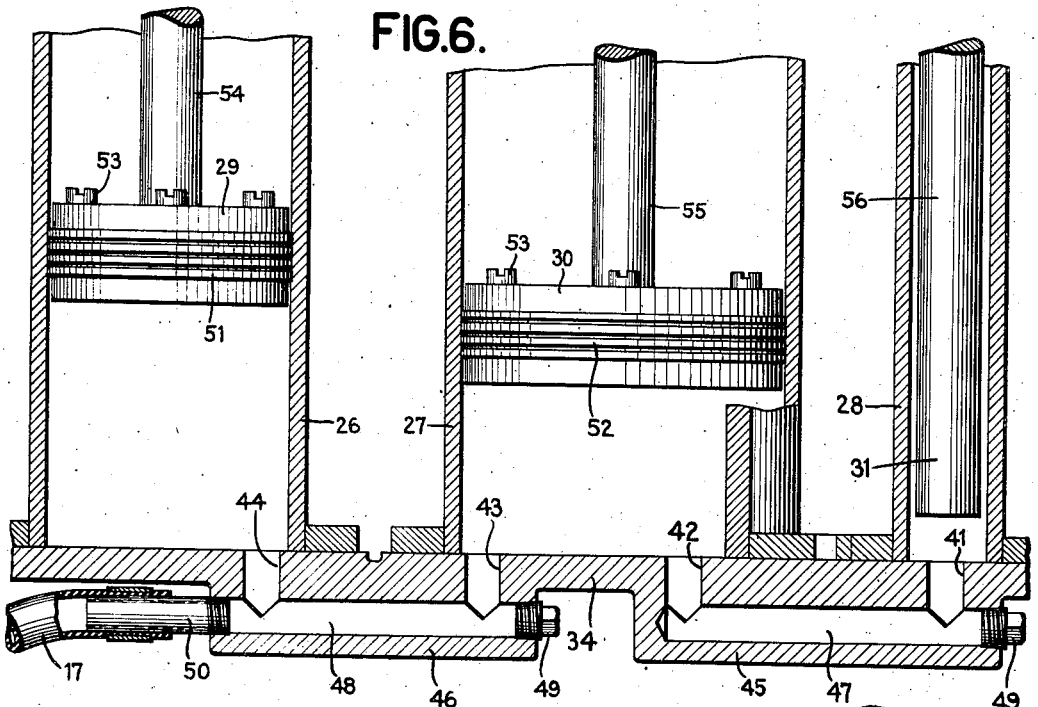
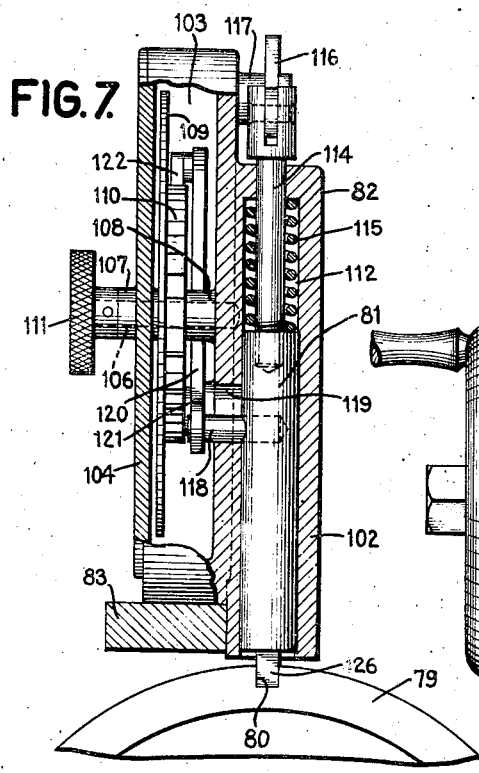
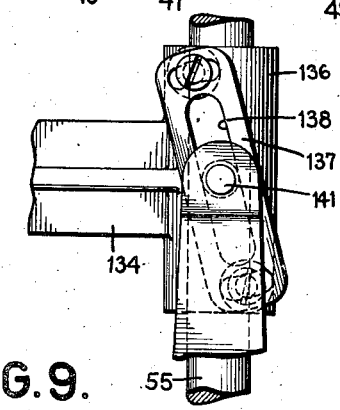
INVENTOR
NIXON LEE
BY *Philip Churchill*
ATTORNEY Patented Nov. 19, 1940

2,221,978

UNITED STATES PATENT OFFICE 2,221,978

MEASURING DEVICE

Nixon Lee, Forest Hills, N. Y.

Application October 20, 1938, Serial No. 235,957

20 Claims. (Cl. 221—102)

This invention relates to method and apparatus for dispensing in a simple and efficient manner measured quantities of a liquid from a container.

It is frequently desirable for distributors and other users of various liquids to draw off measured portions of liquids from containers. For example, it may be desirable in the paint field to prepare a few ounces or quarts of a certain mixture of different kinds of paints or lacquers according to a definite formula by taking fixed amounts of the different paints or lacquers from large containers such as gallon or 5 gallon cans. This is particularly true in the sale and distribution of paints and lacquers where it is desired to carry as small a stock of basic paints and lacquers as possible while still being able to provide purchasers with numerous different mixtures of these same basic paints or lacquers.

My invention provides a simple and effective apparatus and method for drawing off small accurately measured quantities of liquids from containers without requiring the constant cleaning of measuring apparatus after each withdrawal and before using the apparatus for a different liquid. While my invention is particularly applicable to the dispensing of measured quantities of paints and lacquers from cans and other containers, it is to be understood that it is equally useful in connection with drawing off measured quantities of numerous other liquids, such as chemicals and the like, from large glass bottles, carboys and other containers regardless of size. An outstanding advantage of my invention is that it permits the dispensing of measured quantities of liquids directly from original containers in which the liquids are packaged or stored.

One object of the invention is to provide a method and apparatus for introducing a measured quantity of a gas into a gas-tight container to displace and force out of the container a predetermined volume of liquid.

A further object is to provide apparatus for accomplishing the foregoing object which can be easily and quickly applied to a succession of containers holding different liquids.

Another object of the invention is to provide a method and apparatus for carrying out the above objects by producing first within the container a slight pressure placing the system in readiness to dispense liquid, and thereafter supplying a measured quantity of gas to the container whereby an equivalent quantity of liquid will be discharged.

Another object of my invention is to provide apparatus for carrying out the invention when applied to containers of different sizes, and including mechanism for indicating the quantities of liquid discharged.

Other objects and advantages will be described and will be apparent from the following description of a particular embodiment of my invention illustrated in the drawings, in which:

Figure 3 is a top plan view of the apparatus shown in Figure 2.

Figure 4 is a side elevation, partly in section, of one end of the apparatus shown in Figure 2.

Figure 5 is a vertical cross section through the apparatus taken on the line 5—5 of Figure 3 and partly broken away to illustrate certain details of the mechanism.

Figure 6 is a horizontal sectional view through the pistons and cylinders taken on the offset line 6—6 of Figure 2.

Figure 7 is a vertical section through one of the indicators of the apparatus.

Figure 8 is a detail view on an enlarged scale taken on the line 8—8 of Figure 5.

Figure 9 is an additional detail view partly in section taken on the line 9—9 of Figure 3.

Figure 1:
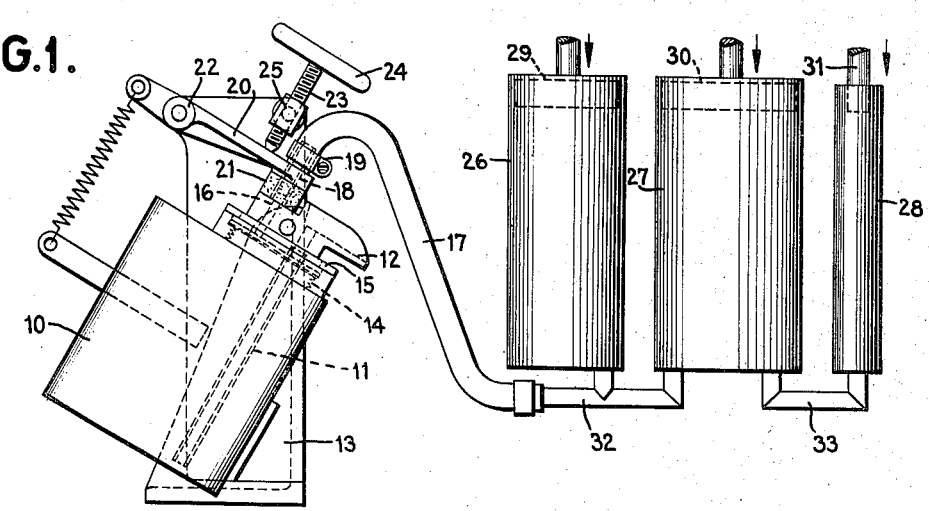
Figure 1 shows somewhat diagrammatically a container from which liquid is to be dispensed and a series of pistons and cylinders for supplying measured quantities of air to the container to dispense liquid therefrom.

With reference more particularly to Figure 1, suitable means are provided according to my invention for sealing a can or other container 10 at its top to make the can gas-tight, so that the forcing of measured quantities of a gas into a can will serve to displace and force out through the conduit 11 and the spout 12 an equivalent quantity of liquid from the can 10. Conduit 11 is arranged to extend substantially to the bottom of the can so that the contents thereof may be as completely discharged as possible. One suitable form of device for sealing and clamping the can 10 is shown in Figure 1 and is supported by the frame 13. The can in this instance is provided with an upwardly extending section 14 having external threads to receive normally a screw cap or other suitable closure.

For purposes of my invention, an assembly including a conduit 11 and spout 12 suitably fixed to collar 15 are screwed on to the top 14 of the can 10 in place of the usual closure. The collar 15 is provided with an opening 16 for the admission of gas to the top of the container 10. Flexible hose 17 for supplying the gas to the container has attached to its end a short, stiff tube 18 held in the hose by the clamp 19. This tube 18 may be inserted through an opening in the end of arm 20 and through a gasket 21 in registry with the opening 16. Arm 20, which may be pivotally supported by the frame 13 at 22, is then clamped against the gasket 21 by the pressure screw 23 having a hand wheel 24 and mounted in the block 25 which in turn is pivotally supported on the frame 13. A gas, such as air, may be supplied from the measuring apparatus illustrated in more detail in Figures 2 to 9, inclusive, and including the cylinders 26, 27 and 28 in which the pistons 29, 30 and 31 are operated. At one end, the interiors of the three cylinders 26, 27 and 28 are connected in series by means of the pipes 32 and 33 (Fig. 1) or by other suitable means hereinafter described. Flexible hose 17 may be connected to either of these pipes and is illustrated as connected to one end of the pipe 32.

An important feature of my invention is the apparatus for supplying measured quantities of a gas, such as air, to the container through the hose 17. This apparatus (Figs. 2–9) is mounted in a frame comprising the front panel 34, which may have rearwardly extending flanges 35 cast integrally therewith. A rear frame member 36 carrying suitable bearings may be connected to the front frame panel 34 by means of the four tie rods 37, 37 and 38, 38 held in place by suitable nuts 39. The cylinders 26, 27 and 28 are secured to the front frame member 34 by means of the bolts 40 extending through panel 34. The panel member 34 of the frame is preferably provided with an opening 41 communicating with the end of the cylinder 28, two openings 42, 43 communicating with the end of cylinder 27, and an opening 44 communicating with the end of cylinder 26. The thick portions 45, 46 of the frame panel 34 may be drilled to provide the openings 47, 48 connecting the openings 41, 42 and the openings 43, 44, respectively. Suitable plugs 49 may be employed to seal the open ends of the openings 47, 48, and the flexible hose 17, made of rubber or other suitable material, may be clamped in any desirable manner to the short pipe section 50 threaded into the opening 48. It will be seen that the interiors of the cylinders 26, 27 and 28 are thus connected in series and to the air supply pipe 17 leading to the can or other container 10.

Pistons 29 and 30 may be of any conventional construction affording a tight fit with the inner walls of cylinders 26, 27 respectively. Suitable piston rings 51, 52 may be employed for this purpose, the piston assemblies being held together by the bolts 53. Piston 29 is fixed to one end of operating rod 54 and piston 30 is fixed to one end of the operating rod 55. Piston 31, which is of considerably smaller diameter than pistons 29 and 30, may consist of the end of operating rod 56 which extends into the cylinder 28 through any suitable form of gas-tight stuffing box 57.

Operating rod 54 preferably has clamped thereon a suitable cross head 58 and is arranged to slide axially through the bearing 59 in the frame member 36. The other end of cross head 58 is provided with an enlarged end having internal threads to receive the threads 61 on rod 62. Rod 62 may be mounted for rotation in the bearing 63 in frame member 36 and the bearing 64 in frame panel 34. Collars 64a and 64b on each side of bearing 64 may be used to prevent axial movement of the rod 62. A suitable hand wheel 65 may be connected to the end of rod 62 which extends through panel 34.

Operating rod 55 is arranged to slide through the bearing 66 in frame member 36 and has clamped or otherwise fixed thereto a suitable cross head 67. Cross head 67 is provided with an enlarged end 68 having internal threads to receive the threads 69 on the rotatable rod 70. One end of rod 70 is mounted for rotation in the bearing 71 in frame member 36, and the other end of rod 70 is rotatably mounted in bearing 72 in the front frame member 34. The front end of rod 70 which projects through panel 34 may have fixed thereto a suitable hand wheel 73.

For purposes of measuring the extent of movement of piston 30 and thus the amount of air forced out of the cylinder 27, an indicating mechanism is provided. A bevel gear 74 is splined to the rod 70, for a purpose to be hereinafter described, and meshes with bevel gear 75 carried on the short shaft 76 mounted in suitable bearings 77 and 78 integral with the frame member 34. Fixed to the shaft 76 are a plurality of discs 79, four such discs being illustrated. These discs are each provided with a succession of notches 80 uniformly spaced from each other around their periphery, the disc nearest bevel gear 75 preferably carrying the greatest number of notches, the second disc having half as many notches, the third disc having one quarter as many notches as the first, and the disc furthest away from gear 75 having one eighth as many notches as the first disc.

The notches 80 on the discs 79 are adapted to engage a detent carried by the lower end of a plunger 81 associated with the indicator 82. Indicator 82 may be mounted upon a suitable bar 83 supported in bearings 84, 85 for sliding movement in a direction parallel to the shaft 76.

Referring now to the rod 56 which is in effect a piston operating in cylinder 28, rod 56 is mounted for axial movement in a bearing 86 in frame member 36 and has clamped thereto a suitable cross head 87. The enlarged end 88 of cross head 87 is internally threaded to receive threads 89 on rod 90. Rod 90 is rotatably mounted in the bearing 91 in frame member 36 and in the bearing 92 in frame member 34. Rod 90 is preferably mounted to prevent any axial movement thereof and collars 92a and 92b may be fixed to the rod on each side of bearing 92 for this purpose. A suitable hand wheel 93 is affixed to the outer end of the rod 90 for rotating it. Bevel gear 94 is fixed to the rod just inside panel 34 and meshes with bevel gear 95 fixed to the shaft 96. Shaft 96 may be carried in suitable bearing members 97, 98 which are integral with the frame member 34. Fixed to the shaft 96 are a plurality of discs 99 carrying notches in their periphery in the same manner as described in connection with discs 79. Discs 99 cooperate with the indicator 100, which is also fixed to the bar 83 so that a plunger 101 will bear against the surface of one of the discs 99.

The indicators 82 and 100 are identical in construction and operation, except that indicator 82 is designed to indicate ounces, quarts, gallons or other suitable measure, while indicator 100 is arranged to indicate fractions thereof. A description of the construction and operation of indicator 82 will suffice for both. Indicator 82 is illustrated particularly in Figures 5 and 7 and includes a solid frame 102 clamped or otherwise fixed to the bar 83. A circular opening 103 is provided within the front portion of frame 102 and is closed by front panel 104 held in place by screws or the like and having a small square opening 105 near its top.

A shaft 106 is mounted within the opening 103 for rotation in the bearings 107, 108 and has fixed thereto inside the panel 104, an indicator dial 109 carrying suitable indicia and a driving ratchet 110. The indicia on the dial 109 are arranged to register at appropriate times with the opening 105. A hand knob 111 may be provided for resetting the dial 109 to zero when desired by turning it clockwise as viewed in Figure 5.

The rear portion of the frame 102 is provided with a cylindrical opening 112 to receive the plunger 81. Rod 114 is threaded into the top of the plunger and is small enough to leave a space within the cylinder 112 for a coil spring 115, urging the plunger 81 downward. The upper end of rod 114 is pivotally connected to one end of hand lever 116. Hand lever 116 is pivoted to the frame 102 at a point 117 removed a short distance from pivot 116. Depression of the outer end of hand lever 116 thus serves to raise rod 114 and plunger 81. Intermediate its ends, plunger 81 has fixed thereto a pin 118 which extends through an opening 119 in the frame and is pivotally connected to one end of the bellcrank 120. Bellcrank 120 is pivoted to the frame of the indicator at 121. The other end of bellcrank 120 has pivotally connected thereto a pawl 122, normally held in engagement with the ratchet 110 by means of the spring 123. If desired, a check pawl 124 pivoted on the indicator frame may also be provided together with a spring 125 to insure proper operation of ratchet 110. The lower end of plunger 81 carries a detent 126 adapted to drop into one of the notches 80 of one of the discs 79. As the detent 126 drops into such a notch 80, the plunger is forced downward by the action of the spring 115, thus moving downward the horizontal arm of the bellcrank 120 connected to it, and causing pawl 122 to rotate the ratchet 110 and the dial 109 one notch. When the detent 126 drops into a notch 80 of one of the discs 79, rotation of the discs 79 together with the mechanism connected thereto is arrested. To allow further rotation of the discs 79, the plunger 81 on the indicating means is raised by depressing the hand lever 116 to raise the plunger 81 and detent 126.

The operation of the device described thus far will be best understood when described in connection with the making of a hypothetical formula by dispensing certain measured quantities of different kinds of paint from their respective containers into a common receptacle to be used for mixing. For example, the formula may be 1 1/16 ounces white, 2 1/2 ounces green, 1/16 ounce blue. Containers such as 1 or 5 gallon cans of white, green and blue paint are preferably each provided with separate closure assemblies, including the conduit 11 and the pouring spout 12. The hose 17 is then clamped to the closure on the can of white paint by means of the hand screw 23. The receptacle to receive the measured quantities of different paints is placed under the spout 12. The dials of the indicating mechanisms 82, 100 are turned by means of the knobs 111 so that the dials 109 indicate a reading of zero through the openings 105. Hand wheel 65 is then rotated in a clockwise direction, as viewed in Figure 2, moving the cross head 58, operating rod 54 and piston 29 toward the front panel 34 until sufficient air has been forced out of cylinder 26 and through the hose 17 into the container 10 to bring the level of paint to the top of the conduit 11. The air in the container 10, hose 17 and cylinders 26, 27, 28 is now maintained under the slight positive pressure created, which will be the amount caused by the weight of the column of paint in the conduit 11 above the level of the paint in the can 10.

Hand wheel 73 is now rotated in a clockwise direction, rotating the bevel gear 74, which in turn rotates the bevel gear 75 and the discs 79 so that the top of the discs 79 move in a direction away from the panel 34. At the same time cross head 67, operating rod 55 and piston 30 will be moved toward the panel 34 by means of the threads 69 on rod 70. Air will thus be forced out of cylinder 27 through opening 43 into hose 17 and thence into the can 10. This rotation of rod 70 and discs 79 is continued until the detent 126 drops into the first notch 80 on the disc 79, thus locking hand wheel 73 against further rotation. Detent 126 will have been engaged in one of the notches 80 before starting rotation of hand wheel 73; to allow hand wheel 73 to be turned initially, the detent 126 will have been lifted by pressing down on the lever 116. The space between the notches 80 on the first disc 79 will be so calibrated that in the travel of this disc from one notch to another, the piston 30 will force a measured quantity such as one ounce of air out of the cylinder 37 into the container 10. As the detent 126 falls into the notch 80, the plunger 81 drops down under the action of spring 115, and through movement of the pin 118, bellcrank 120, and pawl 122 rotates the dial 109 one notch in a clockwise direction as viewed from the front of the machine in Figure 2. This indicator will then read one ounce. As the ounce of air is forced into container 10, an ounce of white paint will be forced up through conduit 11 and out of the spout 12 into the waiting receptacle.

Figure 2:
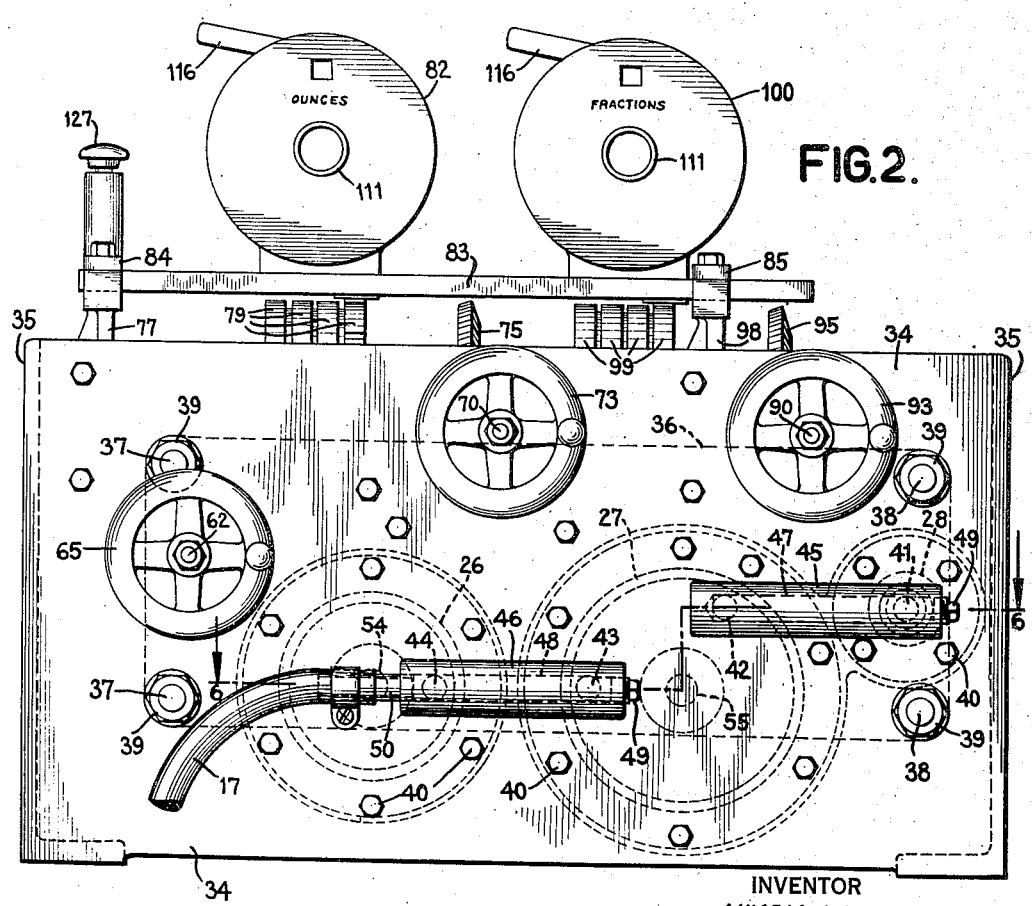
Figure 2 is a front elevation of apparatus for supplying measured quantities of air to the container.

In order to obtain the additional one sixteenth ounce, hand wheel 93 is now rotated in a clockwise direction, as viewed in Figure 2, moving the cross head 87 and the operating rod and piston 56 toward the panel 34. Simultaneously, the bevel gear 94 is rotated by rod 90 and rotates bevel gear 95. In this manner, the discs 99 will be similarly rotated until the detent on the plunger 101 of indicator 100 reaches the first notch of the disc 99 and drops in place. This indicating mechanism 100 will then operate as previously described to indicate discharge of 1/16 ounce. The spaces between notches on the disc 99 will have been calibrated so that the plunger or rod 56 displaces 1/16 ounce of air inside the cylinder 28 during movement of the disc from one notch to the next, forcing this displaced air through the passages 41, 47, 42, 43 and 38 to the hose 17 and thence into container 10. In this manner an additional 1/16 ounce of white paint will be discharged by the spout 12, making 1 1/16 ounces of white paint in the receptacle.

The hose 17 is now disconnected from the can of white paint, the assembly 11, 12 and 15 being left attached to the can, and the can of green paint provided with a similar assembly is clamped in place in the manner previously described. The indicator dials on the indicating mechanisms 82 and 100 are reset to zero. The system with the new can is again brought into equilibrium by rotation of the hand wheel 65 to raise the level of liquid in the conduit 11. Hand wheel 73 is then rotated, after first pressing down lever 116 on the indicator mechanism 82, until the detent 126 drops into the next notch 80 in the disc 79. This, as previously described, forces 1 ounce of green paint out of the spout 12 into the waiting receptacle. Since two ounces of the green paint are desired, lever 116 is again pressed down and rotation of hand wheel 73 is continued until the next notch 80 is reached which causes discharge of the second ounce of paint. Rotation of hand wheel 93 is now started in the same manner and continued for eight successive notches on disc 99, until $\frac{8}{16}$ or $\frac{1}{2}$ ounce of additional green paint has been discharged into the waiting receptacle.

The green paint can may then be disconnected from the hose 17 and the can of blue paint brought into place. As previously described, the system is first brought into equilibrium by rotation of the hand wheel 65 forcing the blue paint up to the top of conduit 11. Since in this case only $\frac{7}{16}$ ounce is desired, hand wheel 93 is then rotated until seven successive notches on the disc 99 have been passed.

The receiving receptacle now contains the desired formula and the only portions of the apparatus that have come in contact with the paint are the conduits 11 and pouring spouts 12 which, of course, may easily be provided for each can of paint. The measuring apparatus itself does not require any cleaning. The operation of the notches in the discs 79 and 99 serves to arrest temporarily the rotation by hand wheels 73 and 93, respectively, thus preventing any over-running in measuring out the liquid.

The foregoing formula is designed to make four ounces of mixed paint. If an order should be received for twice this amount for example, the plunger 127 will be raised against the action of the spring 128 to withdraw the detent 129 from one of the notches 130 in the bar 83. The bar 83 to which the indicating mechanisms 82 and 100 are attached may now be slid endwise until the plungers 81 and 101 of the indicating mechanisms are in position over the second of the discs 79 and 99 from the bevel gear 75 and 95, respectively. Detent 129 at this point will drop into place into the second of the notches 130 in bar 83. The notches on the second of the discs may be easily spaced twice as far apart as the notches on the first of the discs 79 and 99. Consequently, the same manner of procedure may be followed in this case, but while the indicating dials of the mechanisms 82 and 100 will indicate the amounts in terms of the formula used, actually double these amounts will have been discharged from the cans 10. In a similar manner the other two discs 79 and the other two discs 99 may be arranged with the notches 80 spaced enough farther apart for purposes of making up mixtures of other multiples of the desired formula.

While the indicating mechanisms have been described as calibrated in ounces and fractions of ounces, it will be apparent, of course, that these mechanisms may be calibrated in quarts and fractions of quarts, or in any other suitable quantities for measuring by volume.

It is not necessary that the can be tilted to the position in which it is shown in Figure 1 to effect discharge from the spout 12. A tilting arrangement is advantageous, however, in reducing somewhat the amount of pressure required to bring the system into equilibrium at the start of the measuring operation. It will be apparent that the amount of pressure on the entire system needed to maintain the system in equilibrium will increase gradually as the level of liquid in the container 10 becomes lower. The reason for this is that the height of liquid in the conduit 11 above the level of liquid in the container 10 determines the amount of pressure needed. Consequently, as the level of liquid in container 10 becomes lower, the column of liquid in conduit 11 above this level becomes higher. This variable may introduce a slight error into measuring operations if it is not compensated for, and the error will vary with the amount of liquid to be discharged from the can 10, the height of the can 10, specific gravity of the liquid being measured, and the dimensions of the conduit 11. Under normal circumstances however, the change in pressure in the can 10 will be so slight that the error in measuring will be substantially negligible and may be entirely discounted.

For measuring out larger quantities of liquid however, it may be preferable to employ a compensating device, such as I have illustrated applied only to the operation of piston 30 but which may, of course, be also applied to the operation of plunger 56. For this purpose, the operating rod 70 is so mounted in bearing 71 and bearing 72 as to provide for a small amount of axial movement of the rod. The bevel gear 74 may be splined to the rod 70 by means of a key 131 arranged to slide in the slot 132. The collar 70a bearing against bearing 72 insures maintaining the bevel gear 74 in mesh at all times with the bevel gear 75. To effect the compensating movement of rod 70, and through the cross head 67 an additional movement of rod 55 and piston 30, the rod 70 may be provided with a sleeve 133 having threads with a pitch considerably less than the pitch of threads 69. A cross head 134 is provided having one end 135 internally threaded to mesh with the threads on the sleeve 133. The other end 136 of cross head 134 is arranged to slide on the operating rod 55. The end 136 of cross head 134 has pivotally mounted thereon a slot cam 137 with its slot 138 disposed at an angle to the rod 55. Bellcrank 139 may be pivoted on a pin 140 fixed to the exterior of cylinder 27. One arm of the bellcrank 139 is provided with a pin 141 which slides in the slot 138. The other end of bell crank 139 is preferably provided with bifurcated arms 142 carrying inwardly extending pins 143 which engage groove 144 of collar 145. Collar 145 may be fixed to rod 70 by means of the pin 146.

It will be seen that this mechanism provides for an additional movement of rod 55 over that supplied to it merely by rotation of the threads 69.

As rod 70 is rotated, cross head 134 will be moved towards the panel 34 and the cam slot 138 will move the bellcrank 139 by means of the pin 141 to rotate the bellcrank in a counter-clockwise direction as viewed in Figure 3. This in turn will serve to move the bifurcated arms 142, the pins 143, collar 145, and rod 70 toward the panel 34, thus providing an axial movement of the rod 70 toward the panel 34 which produces an additional movement of the operating rod 55 and piston 30 through the cross head 67. By adjusting and properly setting the angle of slot cam 137 in advance, this compensating device makes accurate measurement and dispensing of liquid possible, even though the containers of liquid vary in size and the liquid varies in specific gravity with different containers.

Under ordinary circumstances however, with containers of one gallon or even five gallon size and with liquids of low specific gravity, the pressure in the measuring apparatus will vary so slightly that displacement of one ounce of air from one of the cylinders will cause a discharge of almost exactly one ounce of liquid from the container 10. If desired, the compensating mechanism may be eliminated and the pistons, cylinders, and/or discs 79 and 99 may be so calibrated as to supply sufficient gas to dispense exactly the desired quantity of liquid from containers of a given size.

It will be apparent that other forms of apparatus may be used to practice my invention. In some instances the indicating mechanism may be very much simplified, or the indicators may even be eliminated. One or two of the cylinders 26, 27 and 28 may be eliminated if its function is incorporated in the remaining cylinder or cylinders, or if its function is not considered necessary. It is understood that the invention is not limited to a piston and cylinder arrangement since other devices might be used for supplying measured quantities of gas to the container. Various other modifications will be apparent to those skilled in the art.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus of the character described, a gas tight container for holding a liquid, conduit means extending from below the level of said liquid to a point above said level for discharging said liquid from said container, and means for introducing into said container a measured quantity of a gas to effect a discharge from said container of a predetermined quantity of said liquid through said conduit means.

2. In apparatus of the character described, a gas tight container for holding a liquid, conduit means extending from below the level of said liquid to a point above said level for discharging said liquid from said container, means for applying sufficient gaseous pressure to said container to raise liquid substantially to the top of said conduit means, and means for supplying thereafter a measured quantity of a gas to said container to discharge a predetermined quantity of liquid through said conduit means.

3. In apparatus of the character described, a container for liquid, means for holding said container in a fixed inclined position to facilitate discharging measured quantities of said liquid therefrom, and a gas tight closure for said container including conduit means extending through said closure to a point below the level of liquid in the container, a pouring spout associated with said conduit means outside said container, and means for connecting a gas supplying pipe to said closure for introducing gas into the container.

4. In apparatus for dispensing a measured quantity of liquid from a container, a device for supplying a measured quantity of a gas to said container to displace liquid therefrom, said device comprising a cylinder, conduits means for supplying gas from said cylinder to said container, means for forcing gas out of said cylinder into said conduit means, and means associated with said forcing means for indicating the amount of gas expelled from said cylinder.

5. In apparatus for dispensing a measured quantity of liquid from a container, a device for supplying a measured quantity of a gas to said container to displace liquid therefrom, said device comprising a cylinder, conduit means for supplying gas from said cylinder to said container, a piston for forcing gas out of said cylinder, means for moving said piston a predetermined distance in said cylinder and means for arresting movement of said piston after it has moved said distance.

6. In apparatus for dispensing a measured quantity of liquid from a container, a device for supplying a measured quantity of a gas to said container to displace liquid therefrom, said device comprising a cylinder, conduit means for supplying gas from said cylinder to said container, a piston for forcing gas out of said cylinder, means for moving said piston a succession of predetermined distances in said cylinder, and means for indicating the number of movements thus made.

7. A device as defined in claim 6 which includes means for temporarily arresting movement of the piston at the end of each of the movements.

8. A device as defined in claim 6 in which the moving means is arranged to vary the extent of each of the successive movements of the piston.

9. A device as defined in claim 6 which includes means shiftable to increase the extent of each of the successive movements by a multiple consisting of a small whole number.

10. In apparatus for dispensing a measured quantity of liquid from a container, a device for supplying a measured quantity of a gas to said container to displace liquid therefrom, said device comprising a plurality of cylinders, and independent means for forcing gas out of said cylinders into a common conduit.

11. In apparatus for dispensing a measured quantity of liquid from a container, a device for supplying a measured quantity of a gas to said container to displace liquid therefrom, said device comprising a plurality of cylinders of different diameter, a conduit for supplying gas to the container, means for conducting gas from each of said cylinders to said conduit, and means for forcing different amounts of gas out each of said cylinders.

12. In apparatus for dispensing a measured quantity of liquid from a container, a device for supplying a measured quantity of a gas to said container to displace liquid therefrom, said device including a cylinder, a piston operating in said cylinder, a second cylinder, a second piston operating in said second cylinder and having a substantially smaller cross sectional area than said first mentioned piston, a conduit, means for conducting gas from each of said cylinders to said conduit, and means for operating said pistons to force successive predetermined quantities of gas out of said cylinders into said conduit.

13. A device as defined in claim 12 which includes means for indicating the quantities of gas forced out of the cylinders.

14. A device as defined in claim 12 which includes means for temporarily arresting movement of the pistons after forcing each successive predetermined quantity of gas out of the cylinders.

15. A device as defined in claim 12 which includes means for varying the amounts of the successive quantities of gas forced out of the first mentioned cylinder.

16. In apparatus for dispensing a measured quantity of liquid from a container, a device for supplying a measured quantity of a gas to said container to displace liquid therefrom, said device includes three cylinders, a conduit, means for conducting gas from each of said cylinders to said conduit, means for forcing relatively large successive predetermined quantities of gas out of one of said cylinders into the conduit, means for forcing relatively small successive predetermined quantities out of the second of said cylinders into the conduit, and means for applying and maintaining sufficient pressure on the gas in the third cylinder to preserve a fixed pressure on the gas in said conduit during operation of said two forcing means.

17. Apparatus for discharging measured quantities of a liquid from a container, comprising a closure for said container having conduit means extending from below the level of liquid in the container to a point of discharge outside of the container, a device for supplying measured quantities of air to said container, a hose connecting said device and container, and means for removably attaching said hose to said container.

18. A method of discharging a predetermined quantity of liquid from a container comprising providing said container with conduit means for the discharge of liquid extending from a point below the level of liquid to a point outside of said container, sealing said container against escape of gas therefrom, and supplying to said sealed container a measured quantity of gas to effect discharge of said predetermined quantity of liquid through said conduit means.

19. A method of discharging a predetermined quantity of liquid from a container comprising providing said container with conduit means for the discharge of liquid extending from a point below the level of liquid to a point outside of said container, sealing said container against escape of gas therefrom, supplying sufficient gas to said container to force the liquid to substantially the top of said conduit means, and supplying in addition a measured quantity of gas to said container to effect discharge of an equivalent quantity of liquid through said conduit means.

20. A method of discharging a predetermined quantity of liquid from a container comprising providing said container with conduit means for the discharge of liquid extending from a point below the level of liquid to a point outside of said container, sealing said container against escape of gas therefrom, supplying sufficient gas to said container to force the liquid to substantially the top of said conduit means, supplying in addition successive measured quantities of gas to said container to effect discharge of equivalent quantities of liquid through said conduit means, and recording the number of said successive quantities of gas.

NIXON LEE.